(12) United States Patent
Packer et al.

(10) Patent No.: US 6,948,024 B1
(45) Date of Patent: Sep. 20, 2005

(54) EXPANDER DEVICE FOR ISOLATING BUS SEGMENTS IN I/O SUBSYSTEM

(75) Inventors: John S. Packer, San Jose, CA (US); Lawrence J. Lamers, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 395 days.

(21) Appl. No.: 09/846,975

(22) Filed: May 1, 2001

(51) Int. Cl.$^7$ .............................................. G06F 13/20
(52) U.S. Cl. ..................................... 710/313; 710/306
(58) Field of Search ............................... 710/313, 314, 710/305, 306; 719/326

(56) References Cited

U.S. PATENT DOCUMENTS

| | | | | |
|---|---|---|---|---|
| 5,615,345 | A | * | 3/1997 | Wanger ...................... 710/314 |
| 6,185,651 | B1 | * | 2/2001 | Monia et al. ............... 710/240 |
| 6,529,963 | B1 | * | 3/2003 | Fredin et al. .................. 710/1 |
| 6,567,879 | B1 | * | 5/2003 | Benson et al. .............. 710/305 |

* cited by examiner

Primary Examiner—Mark H. Rinehart
Assistant Examiner—Clifford Knoll
(74) Attorney, Agent, or Firm—Martine Penilla & Gencarella, LLP

(57) ABSTRACT

An expander device and method for isolating bus segments from one another in an I/O subsystem. The expander device is arranged to couple the bus segments for communication in the I/O subsystem. The expander device includes a first I/O interface circuit, a second I/O interface circuit, and an expander controller. The first I/O interface circuit is configured to be coupled to a first bus segment and is adapted to interface input and output communication signals with the first bus segment. The second I/O interface circuit is configured to be coupled to a second bus segment and is adapted to interface the input and output communication signals with the second bus segment. The expander controller is coupled to communicate the input and output communication signals between the first and second I/O interface circuits. The expander controller is further arranged to control communication between the bus segments and includes a segment controller adapted to generate a first signal. The segment controller provides the first signal to the first and second I/O interface circuits to disable output of the communication signals from the first and second I/O interface circuits to the first and second bus segments.

17 Claims, 7 Drawing Sheets

EXPANDER DEVICE FOR ISOLATING BUS SEGMENTS IN I/O SUBSYSTEM

CROSS REFERENCE TO RELATED APPLICATIONS

This application is related to U.S. patent application Ser. No. 09/858,321 entitled "Expander Device and Method for Resetting Bus Segments in I/O Subsystem Segmented with Expanders" by John S. Packer et al. This application, filed on the same day as the present application, are incorporated herein by reference.

BACKGROUND OF THE INVENTION

1. Field of the Invention

This invention relates generally to computer I/O subsystems having peripheral bus segments, and more particularly to device and method for isolating bus segments in I/O subsystems.

2. Description of the Related Art

Modern computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

FIG. 1 shows a block diagram of a conventional computer system 100 including a host computer 102, a plurality of SCSI devices 106, and an SCSI bus 108. The host computer 102 includes an SCSI host adapter 104 for communicating with the SCSI devices 106. The host adapter 104 in the computer system 100 controls communucation between the host computer 102 and the SCSI devices 106. For example, the host adapter 104 provides a physical connection between the host computer 102 and the SCSI bus 108. In addition, it is configured to receive data, address, and control signals from the host computer 102 and convert the signals into corresponding SCSI compatible data, address, and control signals. Conversely, the SCSI host adapter 104 is also configured to receive SCSI compatible data, address, and control signals from the SCSI devices 106 through the SCSI bus 108 and convert them into corresponding host-bus compatible data, 15 addressing, and control signals. The SCSI host adapter 104 is well known in the art and may be implemented, for example, by using AIC-7890A™ packaged semiconductor device, which is available from Adaptec Inc., of Milpitas, Calif.

Under the conventional SCSI specifications, the SCSI bus 108 may connect up to 16 SCSI devices including the host adapter 104 depending on the type of SCSI bus implemented. The SCSI devices 106 may be peripheral devices such as disk drives, tape drives, printers, scanners, optical drives, or any other devices that meet the SCSI specification. The SCSI bus 108 is typically implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either 8 or 16 data wires for carrying 8 or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to an SCSI bus is limited to 8 or 16.

Conventional SCSI buses, however, are generally capable of transmitting signals reliably for a specified cable length only. For example, SCSI bus cables conforming to SCSI specifications are typically limited to a maximum length such as 3, 6, 12, or 25 meters, and the like. In modern computer systems such as servers that need to communicate with numerous SCSI devices, some SCSI peripheral devices may be located more than the specified cable length away from a host computer.

In such instances, an expander, which is essentially a repeater, is typically used to add another SCSI bus, which is then used to couple additional SCSI devices. FIG. 2 illustrates a conventional I/O subsystem 200 that includes an expander 214 for connecting a pair of SCSI bus segments 208 and 210. In the I/O subsystem 200, a host computer 202 is coupled to the SCSI bus segment 208 via an SCSI host adapter 204. One or more SCSI devices 206 are coupled to the SCSI bus segment 208. Additionally, one or more SCSI devices 212 and a host computer 216 are coupled to the SCSI bus segment 210 and the host computer 216 also includes an SCSI adapter for communicating with the SCSI bus segment 210. The expander 214 is coupled between the SCSI bus segments 208 and 210 to regenerate signals received on either SCSI bus segments 208 or 210 for transmission to the other SCSI bus segment. By so repeating signals, the expander 214 functions to extend the length of the overall SCSI bus so that additional SCSI devices 212, host computer 316, or other expanders can be attached to the SCSI bus segment 210.

Unfortunately, using the expander 214 as a repeater has several drawbacks. For example, when the host computer 202 is accessing a SCSI device 206 on its bus segment 208, the other host computer 216 typically may not access any SCSI devices 206 or 212. This is so even if the host computer 216 needs to access only the SCSI devices 212 on its bus segment 210. To communicate with SCSI devices 212 on its own bus segment 210, the host computer 216 must wait until the other host computer 216 has completed accessing the SCSI device 206. As can be appreciated, the delay in communicating with SCSI devices 212 on its own bus segment 210 may cause substantial degradation in performance.

In view of the foregoing, what is needed is an expander device and method for for isolating bus segments in an I/O subsystem so that bus segments may operate independent of each other.

SUMMARY OF THE INVENTION

The present invention fills these needs by providing expander device and method for isolating bus segments in an I/O subsystem. It should be appreciated that the present invention can be implemented in numerous ways, including as a process, an apparatus, a system, a device, a method, or a computer readable medium. Several inventive embodiments of the present invention are described below.

In one embodiment, the present invention provides an expander device for isolating bus segments from one another in an I/O subsystem. The expander device is arranged to couple the bus segments for communication in the I/O subsystem. The expander device includes a first I/O interface circuit, a second I/O interface circuit, and an expander controller. The first I/O interface circuit is configured to be coupled to a first bus segment and is adapted to interface input and output communication signals with the first bus segment. The second I/O interface circuit is configured to be coupled to a second bus segment and is adapted to interface the input and output communication signals with the second bus segment. The expander controller is coupled to communicate the input and output communication signals between the first and second I/O interface circuits. The expander controller is further arranged to control communication between the bus segments and includes a segment controller adapted to generate a first signal. The segment controller provides the first signal to the first and second I/O interface circuits to disable output of the communication signals from the first and second I/O interface circuits to the first and second bus segments.

In another embodiment, the present invention provides an SCSI expander for isolating SCSI bus segments in an SCSI I/O subsystem. The SCSI expander is arranged to couple a first bus segment and a second bus segment in the SCSI I/O subsystem and is further configured to repeat communication signals by receiving the communication signals from one SCSI bus segment and outputting the communication signals to the other SCSI bus segment. The SCSI expander includes a first SCSI I/O interface, a second SCSI I/O interface, and an SCSI expander controller. The first SCSI I/O interface circuit is adapted to interface communication signals with the first SCSI bus segment while the second SCSI I/O interface circuit is arranged to interface the communication signals with the second SCSI bus segment. The SCSI expander controller is coupled to communicate the communication signals between the first and second SCSI I/O interface circuits and is arranged to control communication between the first and second SCSI bus segments. The SCSI expander controller includes a segment controller adapted to generate a first signal, which is provided to the first and second SCSI I/O interface circuits to disable output of the communication signals from the first and second SCSI I/O interface circuits to the first and second SCSI bus segments. The disabling of the output of the communication signals effectively isolates the first and second SCSI bus segments from one another in an isolation mode so that the communication signals received on one SCSI bus segment are not transmitted to the other SCSI bus segment.

In yet another embodiment, a method for isolating bus segments in an I/O subsystem is disclosed. The I/O subsystem includes an expander coupled between a first bus segment and a second bus segment. The expander is configured to repeat communication signals by receiving the communication signals from one bus segment and outputting the communication signals to the other bus segment. In this method, the expander receives an isolation command from a host computer on the first bus segment. The isolation command received from the host computer is configured to instruct the expander to isolate the first bus segment from the second bus segment. In response to the isolation command, the expander operates in an isolation mode by preventing communication signals received on one bus segment from being output onto the other bus segment such that the first and second bus segments are isolated from one another.

Advantageously, the expander and method of the present invention allow a dual mode operation for the expander: isolation mode and normal repeating mode. To enter a segment isolation mode, the expander detects an isolation command that instructs the expander to enter a segment isolation mode from either bus segment. Preferably, the expander enters the segment isolation mode in a controlled manner by entering the BUS FREE state before isolation is enabled. In the isolation mode, the expander disables propagation of all signals from one segment to the other. In this mode, each bus segment on either side of the expander operates independent of the other.

To exit from the segment isolation mode, the expander detects an exit isolation command from either bus segment. The expander exits the segment isolation mode in a controlled manner by waiting for the BUS FREE state on the far-side bus segment. The controlled entry and exit to and from the isolation mode protects the segment on the far-side, which is the segment remote from the segment on which a command is received, against signal corruption. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention provides expander device and method for isolating bus segments in an I/O subsystem. It will be obvious, however, to one skilled in the art, that the present invention may be practiced without some or all of these specific details. In other instances, well known process operations have not been described in detail in order not to unnecessarily obscure the present invention.

The present invention allows an expander to operate in dual modes to either isolate bus segments in an I/O subsystem or function as a repeater by propagating communication signals received on one bus segment to the other bus segment. The I/O subsystem includes two or more bus segments and one or more expanders. Each expander couples a pair of bus segments and is adapted to repeat communication signals received on one bus segment to the other bus segment. In this normal operating mode, the expander allows devices attached to one bus segment to communicate with devices on the other bus segment.

The expander device and method of the present invention allow isolation of individual bus segments attached to an expander so that communication signals received from one bus segment is not transmitted to the other bus segment attached to the expander. When an expander receives a command to isolate a bus segment, the expander enters into an isolation mode to disable transmission of communication signals received from one bus segment to the other bus segment. The expander may also exit the isolation mode in response to a command to exit the isolation mode. In this event, the expander enables its signal propagation function so that communication signals received from one bus segment can be transmitted to the other bus segment.

Figure 1:
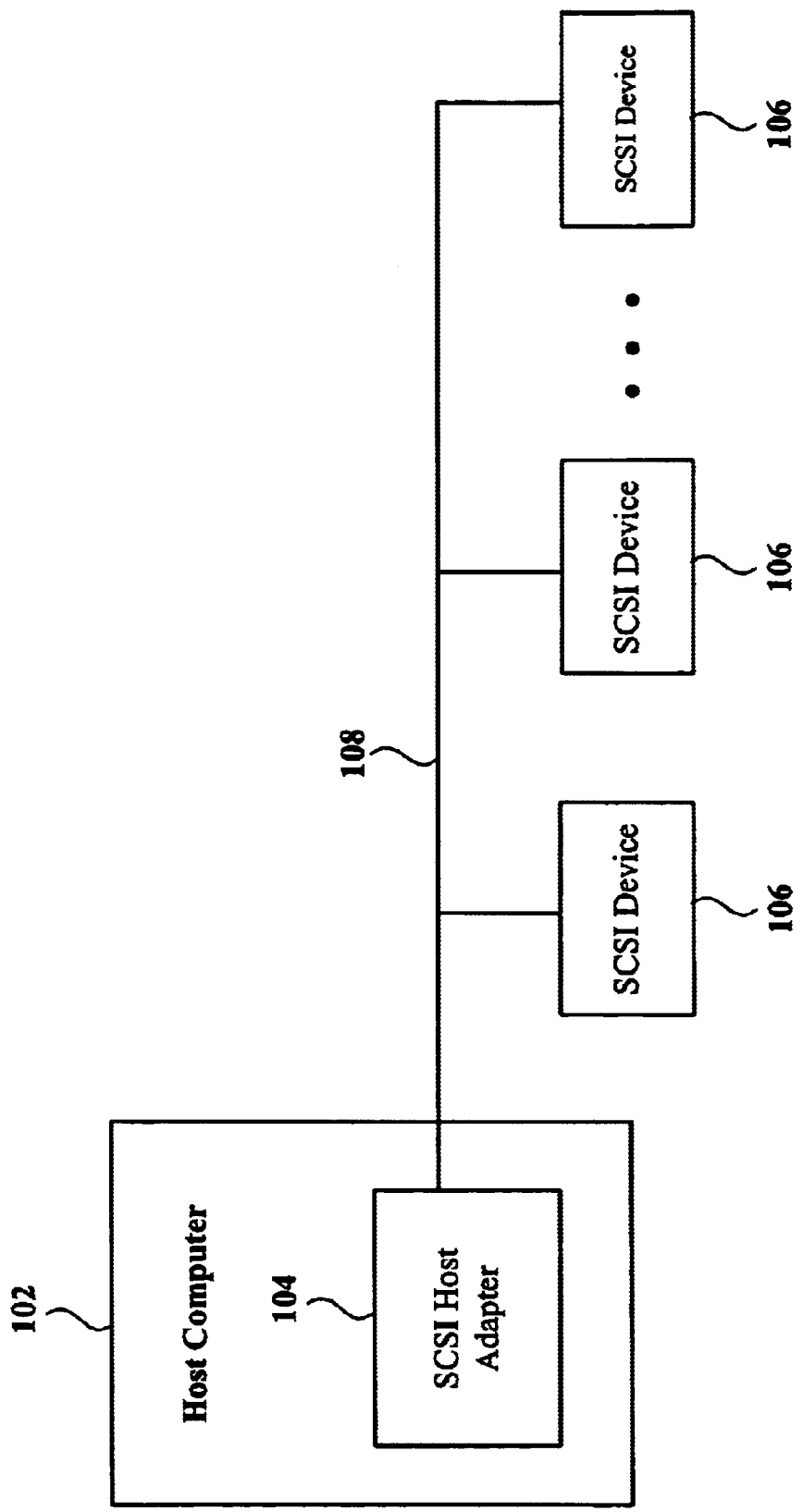
FIG. 1 shows a block diagram of a conventional computer system including a host computer, a plurality of SCSI devices, and an SCSI bus.
Figure 2:
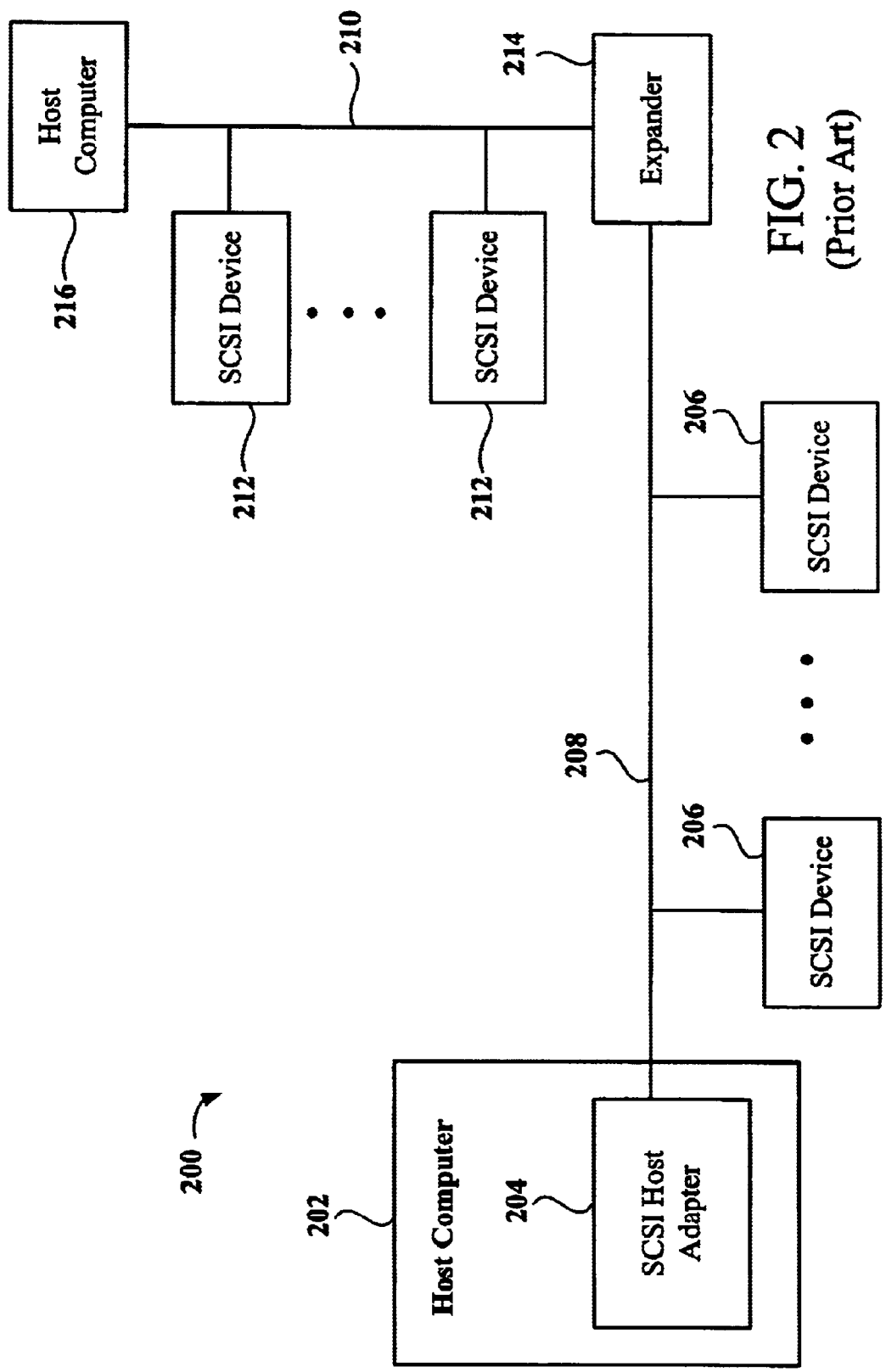
FIG. 2 illustrates a conventional computer system that includes an expander for connecting a pair of SCSI buses.
Figure 3:
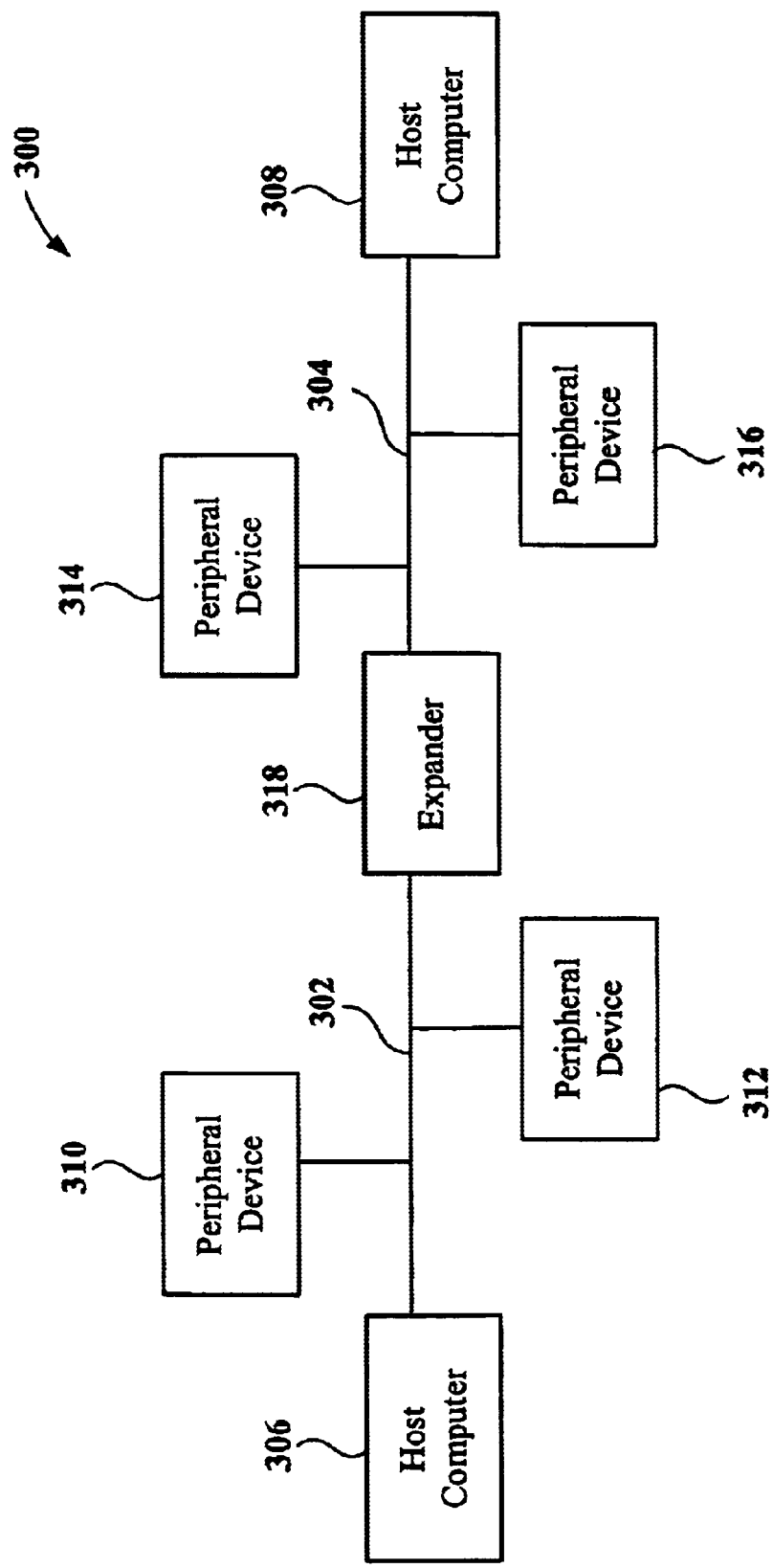
FIG. 3 illustrates an exemplary I/O subsystem including an expander that allows isolation of individual bus segments and in accordance with one embodiment of the present invention.

FIG. 3 illustrates an exemplary I/O subsystem 300 that allows isolation of bus segments 302 and 304 in accordance with one embodiment of the present invention. The I/O subsystem 300 includes one or more host computers 306 and 308, one or more peripheral devices 310, 312, 314, and 316, and an expander 318. Although the present invention is illustrated using the I/O subsystem 300, it should be appreciated that the I/O subsystem 300 may include any number of expanders, bus segments, host computers, and peripheral devices. Preferably, the I/O subsystem 300 is an SCSI bus I/O subsystem with each device, host computer, and bus segment being adapted to recognize and operate under SCSI protocols. Those skilled in the art will, however, recognize that the I/O subsystem 300 may also be implemented using any other suitable in-line bus protocols.

The I/O subsystem 300 defines two bus segments 302 and 304 that are coupled to each other through the expander 318. Each of the bus segments 302 and 304 is adapted to couple devices, preferably in an in-line fashion such as in SCSI bus. For example, the host computer 306 and peripheral devices 310 and 312 are coupled to the bus segment 302 while the host computer 308 and peripheral devices 314 and 316 are coupled to the other bus segment 304. The expander 318 couples the two bus segments 302 and 304 and is adapted to propagate communication signals received on one bus segment to the other bus segment during normal operation.

In this configuration, the bus segments 302 and 304 operate effectively as a single bus for the entire I/O subsystem 300 to allow each host computer 306 or 308 to access devices located at the other side of the expander 318. The I/O subsystem 300 of the present invention also allows the bus segments 302 and 304 to be isolated from each other so that signals are not transmitted from one bus segment to the other. This allows each of the bus segments 302 and 304 with attached devices and host computers to operate independent of the other.

Figure 4:
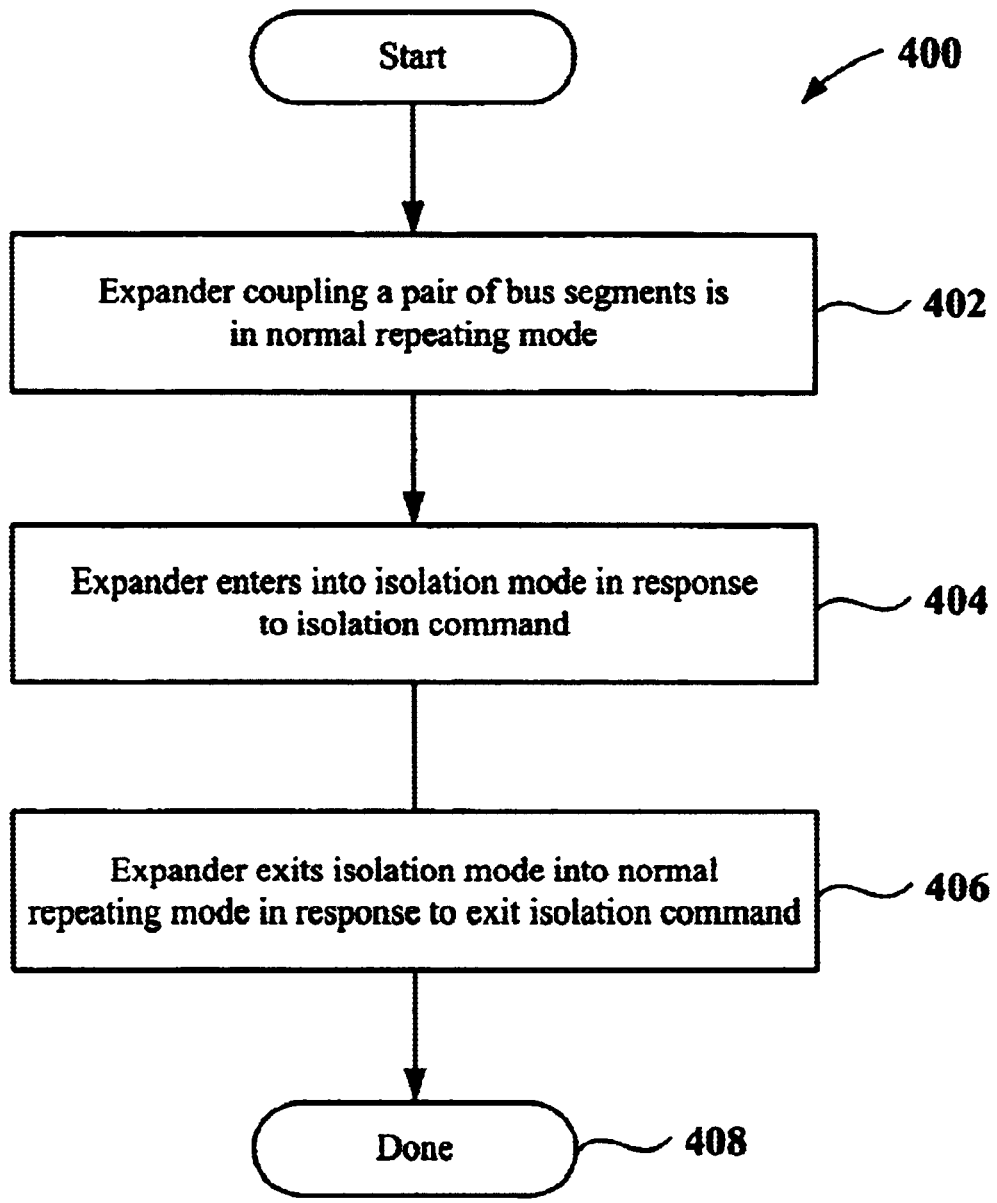
FIG. 4 shows an exemplary method implemented in the I/O subsystem for entering into an isolation mode and exiting from the isolation mode in accordance with one embodiment of the present invention.

FIG. 4 shows an exemplary method 400 implemented in the I/O subsystem 300 for entering into an isolation mode and exiting from the isolation mode in accordance with one embodiment of the present invention. Initially, the expander 318 coupling the bus segments 302 and 304 is in normal operating mode. In this mode, the expander 318 propagates signals received from one bus segment to the other bus segment. For example, the expander 318 repeats signals received on bus segment 302 to the other bus segment 304 and vice versa.

The expander 318 then enters into an isolation mode in operation 404 in response to a command to isolate the bus segments 302 and 304 from a host computer 306 or 308. In this isolation mode, expander 318 stops propagating signals received from one bus segment to the other. Hence, the expander 318 effectively isolates the bus segments 302 and 304 from one another for independent operation.

When bus segments 302 and 304 no longer need to be isolated, the expander 318 exits the isolation mode in operation 406 in response to an exit isolation command from a host computer 306 or 308. Upon exiting the isolation mode, the expander 318 returns to the normal operating mode and resumes repeating signals received on one bus segment to the other bus segment. The method 400 then terminates in operation 408.

Figure 5A:
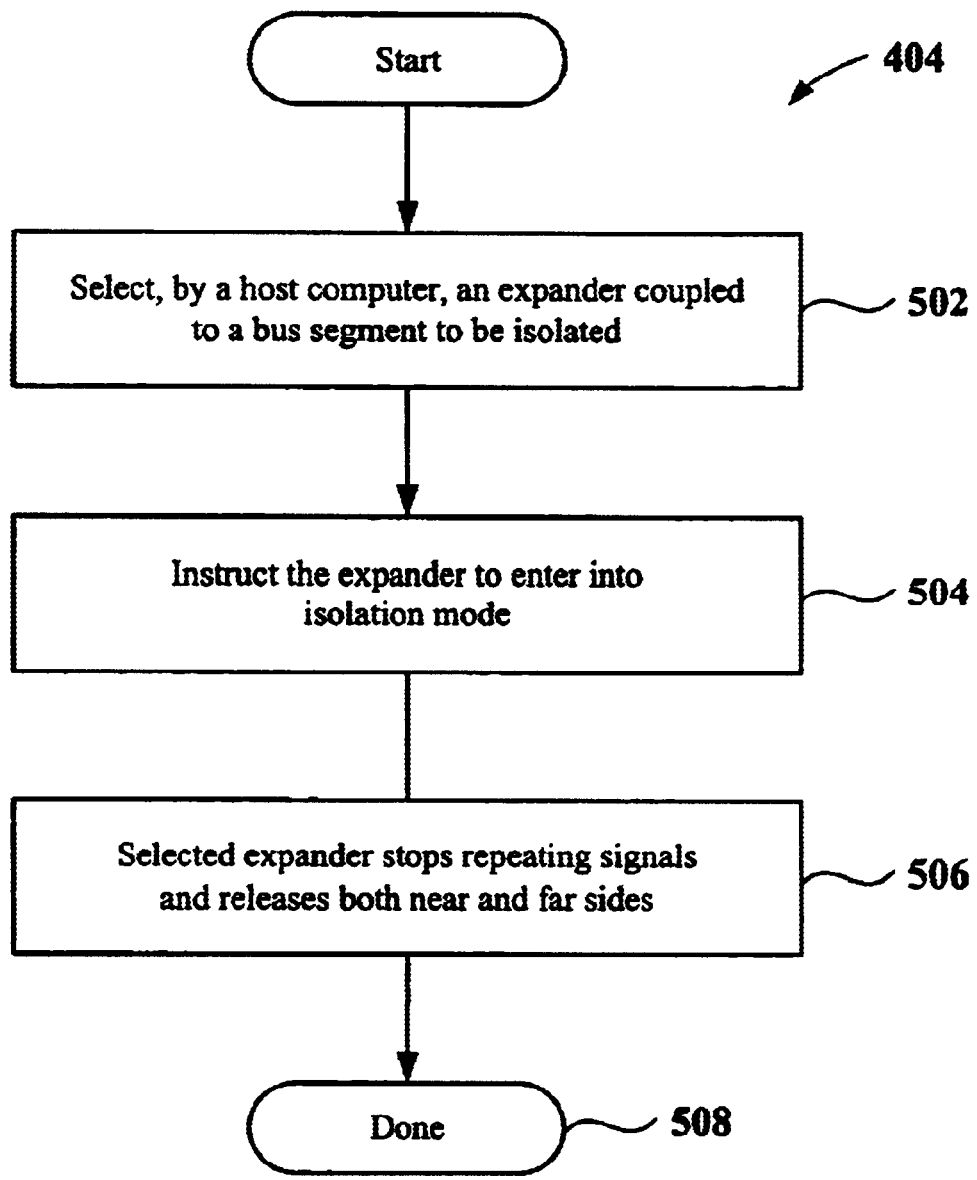
FIG. 5A shows a more detailed flowchart of an operation for entering into an isolation mode in accordance with one embodiment of the present invention.

FIG. 5A shows a more detailed flowchart of the operation 406 for entering into an isolation mode in accordance with one embodiment of the present invention. When bus segments 302 and 304 need to be isolated, a host computer 306 or 308 selects the expander 318 that couples the bus segments 302 and 305 in operation 502. The host computer then instructs the expander 318 to enter the isolation mode by issuing an isolation command in operation 504.

In response to the isolation command, the expander 318 enters the isolation mode and stops repeating signals in operation 506. Preferably, the expander 318 enters the segment isolation mode when far-side bus segment enters a BUS FREE state to prevent signal corruption. For example, if the host computer 306 has requested bus isolation, the expander waits until it releases both segments 302 and 304 to the BUS FREE state. While operating in the isolation mode, the expander 318 stops propagating signals received from one bus segment to the other so that the bus segments 302 and 304 are effectively isolated from one another. On one side, for example, communication takes place only among the host computer 306 and peripheral devices 310 and 312 through the bus segment 302. On the other side, only the host computer 308 and the peripheral devices 314 and 316 communicate with each other via bus segment 304.

Figure 5B:
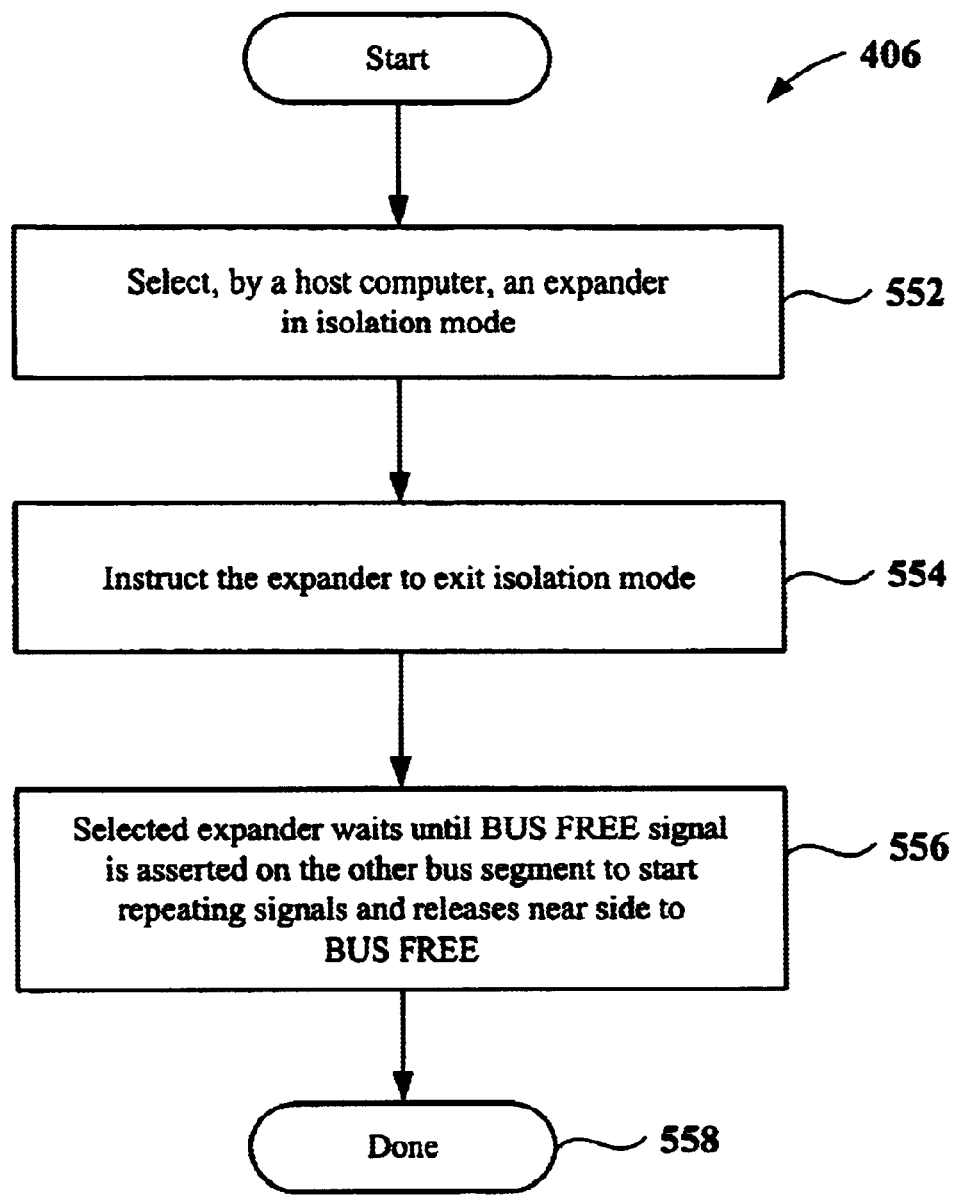
FIG. 5B illustrates a more detailed flowchart of the operation for exiting the isolation mode in accordance with one embodiment of the present invention.

The expander 318 may exit from the isolation mode to operate in its normal operating mode. FIG. 5B illustrates a more detailed flowchart of the operation 406 for exiting the isolation mode in accordance with one embodiment of the present invention. When bus segment isolation is no longer needed, a host computer 306 or 308 selects the expander 318 operating in the isolation mode in operation 552. Then, the host computer instructs the expander 318 to exit the isolation mode by sending an exit isolation command to the expander 318 in operation 554. It should be appreciated that the expander 318 may exit from an isolation mode in response to an exit isolation command from either bus segment 302 or 304.

In response to the exit isolation command, the expander 318 exits from the isolation mode in operation 556 by enabling its signal repeating function between the bus segments 302 and 304. Preferably, the timing of the expander 318 for exiting from the isolation mode is synchronized to the BUS FREE signal on a bus segment that is located on the far side of the expander 318 relative to the requesting host computer. In one embodiment, the expander 318 waits until a BUS FREE signal is asserted on the bus segment remote from the requesting host computer to start repeating signals. For example, if the host computer 306 has sent the exit isolation command to the expander 318, the expander 318 waits until the bus segment 304 on the other side of the expander 318 enters into a BUS FREE state. Conversely, when the host computer transmitted the exit isolation command, the expander 318 waits until a BUS FREE signal is asserted on the bus segment 302 on the other side of the expander 318.

Once the expander 318 has exited from the isolation mode, the expander 318 is back in its normal operating mode. In the normal operating mode, the expander 318 propagates signals received on one bus segment to the other bus segment to allow communication between host computers and peripheral devices attached to the bus segments 302 and 304. The method then terminates in operation 412.

Figure 6:
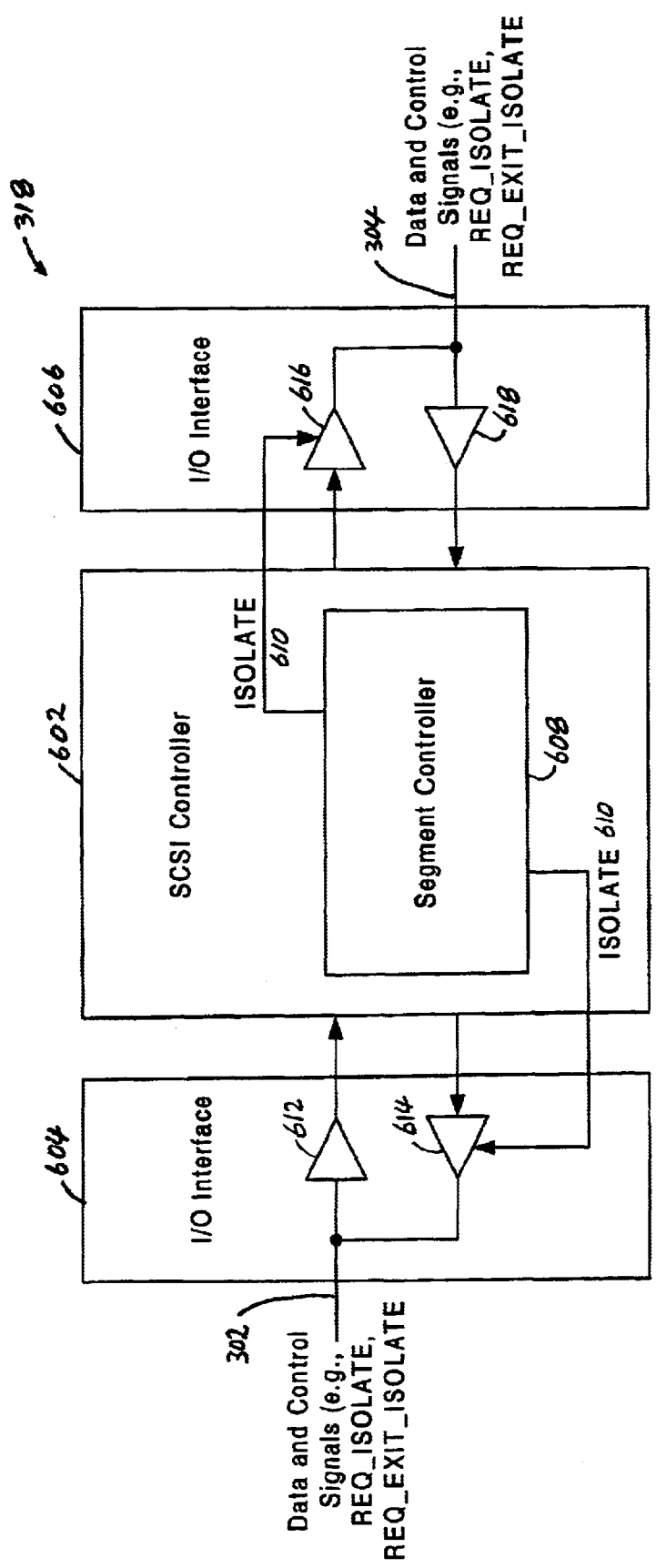
FIG. 6 shows a more detailed schematic diagram of the expander in accordance with one embodiment of the present invention.

FIG. 6 shows a more detailed schematic diagram of the expander 318 in accordance with one embodiment of the present invention. The expander 318 includes an SCSI controller 504 and I/O interfaces 502 and 506. Although the expander 318 is illustrated using an SCSI controller 504, it should be appreciated that other types of expander controllers may be used in conformance with any suitable buses such as in-line buses.

The I/O interfaces 604 and 606 in the expander 318 provides interface to bus segments 302 and 304, respectively, for communicating data and control signals. The I/O interface 604 is coupled between the bus segment 302 and the SCSI controller 602 to provide input and output of the data and control signals. Similarly, the I/O interface 604 is coupled between the SCSI controller 602 to provide input and output of the data and control signals.

The I/O interfaces 604 and 606 include buffers for driving signals on either side of the expander 318. Specifically, the I/0 interface 604 includes an input buffer 612 and an output buffer 614. The input buffer 612 receives communication signals from the bus segment 302 for transmission to the SCSI controller 602 while the output buffer 614 is adapted to receive communication signals from the SCSI controller 602 for output on the bus segment 302. Likewise, the I/O interface 604 includes an input buffer 618 and an output buffer 616. The input buffer 618 is adapted to receive communication signals from the bus segment 304 for transmission to the SCSI controller 602 while the output buffer 616 receives communication signals from the SCSI controller 602 for output on the bus segment 304. In this arrangement, each of the buffers 612 drives an input signal for output. Although the I/O interfaces 604 and 606 are illustrated with an input buffer and an output buffer, it should be appreciated that the I/O interfaces 604 and 606 may include any number of input and output buffer pairs, with each input and output buffer pair being arranged to transmit a signal.

The SCSI controller 602 is coupled receive and/or output data and control signals to and from the buffers 612, 614, 616, and 618 in the I/O interfaces 604 and 606 and is adapted to provide control functions for the expander 318. The SCSI controller 604 includes a segment controller 608 to control the operating mode (e.g., isolation mode, exit isolation mode, normal operating mode) of the expander 318.

During normal operating mode, the buffers 612, 614, 616, and 618 operate to drive input signals for output so that communication signals received on one bus segment is propagated onto the other bus. For example, when a signal is received from the bus segment 302, the input buffer 612 drives the signal onto the SCSI controller 602. The SCSI controller 602 then provides the signal to the output buffer 616, which drives the signal onto the bus segment 304. On the other hand, the input buffer 618 drives a signal received on the bus segment 304 onto the SCSI controller 602, which provides the signal to the output buffer 614. The output buffer 614 then drives the signal onto the bus segment 302. In this manner, the expander 318 repeats signals received on one bus segment to the other bus segment.

When the bus segments 302 and 304 needs to be isolated, a host computer 306 or 308 issues an isolation command REQ_ISOLATE to the expander 318. The SCSI controller receives the isolation command, which is provided to the segment controller 608. In response to the isolation command, the segment controller 608 asserts an ISOLATE signal 610, which is fed to the I/O interfaces 604 and 606.

The asserted ISOLATE signal 610 serves to disable output functions of the I/O interfaces 604 and 606 by disabling the output buffers 614 and 616. Accordingly, the expander 318 does not output signals onto the bus segments 302 and 304. However, the input functions of the I/O interfaces 604 and 606 are not disabled so that the expander 318 may receive communication signals (e.g., commands, data, control signals, etc.), for example, to exit from the isolation mode. That is, the input buffers 612 and 618 are not disabled so that the expander may receive communication signals from bus segments 302 and 304. By disabling of the output functions of the I/O interfaces 604 and 606, the expander 318 effectively prevents repeating or propagation of signals received on one bus segment to the other bus segment.

The expander 318 may exit from the isolation mode into its normal operating mode in response to an exit isolation command, REQ_EXIT_ISOLATE from one of the host computers 306 or 308. When the exit isolation command REQ_EXIT_ISOLATE is received on either bus segment 302 or 304, the expander 602 provides the exit isolation command to the segment controller 608. In response, the segment controller 608 enables the output buffers 614 and 616 by deasserting the ISOLATE signal previously provided to the output buffers. Preferably, the segment controller 608 deactivates the ISOLATE signal when the bus segment remote from the requesting host computer is in BUS FREE state. This ensures synchronous operation of the bus segments 302 and 304 on either side of the expander 318. With the output buffers 614 and 616 enabled, the expander 318 repeats signals between the bus segments 302 and 304 in a normal operating mode.

Thus, the expander device and method of the present invention allow a dual mode operation for the expander in either isolation mode or normal repeating mode. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An expander device for isolating bus segments from one another in an I/O subsystem, the expander device coupling the bus segments for communication in the I/O subsystem, the expander device including:

a first I/O interface circuit configured to be coupled to a first bus segment, the first I/O interface circuit being adapted to interface input and output communication signals with the first bus segment;

a second I/O interface circuit configured to be coupled to a second bus segment and being adapted to interface the input and output communication signals with the second bus segment; and an expander controller coupled to communicate the input and output communication signals between the first and second I/O interface circuits, the expander controller being arranged to control communication between the bus segments, the expander controller including a segment controller adapted to generate a first signal, wherein the segment controller provides the first signal to the first and second I/O interface circuits to disable output of the communication signals from the first and second I/O interface circuits to the first and second bus segments, the disabling of the output of the communication signals isolates the first and second bus segments from one another in an isolation mode so that the communication signals received on either bus segment are allowed but are not transmitted, the expander transitions from the isolation mode to a normal operating mode in order to repeat communication signals by receiving the communication signals from one of the first bus segment or the second bus segment and outputting the communication signals to one of the second bus segment or the first segment.

2. The expander device as recited in claim 1, wherein the expander device is adapted to receive the communication signals from the first and second bus segments while in the isolation mode.

3. The expander device as recited in claim 2, wherein the segment controller generates the first signal in response to an isolation command received from the first bus segment.

4. The expander device as recited in claim 3, wherein the segment controller deasserts the first signal to exit from the isolation mode.

5. The expander device as recited in claim 4, wherein the segment controller deasserts the first signal when the second bus segment is in a bus free state.

6. The expander device as recited in claim 3, wherein the first I/O interface circuit includes a first input buffer and a first output buffer and wherein the second I/O interface circuit includes a second input buffer and a second input buffer.

7. The expander device as recited in claim 6, wherein the first and second input buffers are arranged to drive the communication signals for input to the expander device from the first and second bus segments, respectively, and wherein the first and second output buffers are arranged to drive the communication signals for output from the expander device to the first and second bus segments, respectively.

8. The expander device as recited in claim 7, wherein the first signal disables the first and second output buffers to disable the output of communication signals to the first and second bus segments, respectively.

9. The expander device as recited in claim 1, wherein the first and second bus segments are SCSI bus segments and wherein the expander controller is an SCSI controller.

10. An SCSI expander for isolating bus segments in an SCSI I/O subsystem, the SCSI expander device coupling a first SCSI bus segment and a second SCSI bus segment in the SCSI I/O subsystem, the SCSI expander being configured to repeat communication signals by receiving the communication signals from one SCSI bus segment and outputting the communication signals to the other SCSI bus segment, the SCSI expander comprising:

a first SCSI I/O interface circuit adapted to interface communication signals with the first SCSI bus segment;

a second SCSI I/O interface circuit adapted to interface the communication signals with the second SCSI bus segment; and an SCSI expander controller coupled to communicate the communication signals between the first and second SCSI I/O interface circuits, the SCSI expander controller being arranged to control communication between the first and second SCSI bus segments, the SCSI expander controller including a segment controller adapted to generate a first signal, wherein the segment controller provides the first signal to the first and second SCSI I/O interface circuits to disable output of the communication signals from the first and second SCSI I/O interface circuits to the first and second SCSI bus segments, wherein the disabling of the output of the communication signals isolates the first and second SCSI bus segments from one another in an isolation mode so that the communication signals received on either SCSI bus segment are allowed but not transmitted to the other SCSI bus segment, the expander transitions from the isolation mode to a normal operating mode in order to repeat communication signals by receiving the communication signals from one of the first SCSI bus segment or the second SCSI bus segment and outputting the communication signals to one of the second SCSI bus segment or the first SCSI segment.

11. The SCSI expander as recited in claim 10, wherein the SCSI expander is adapted to receive the communication signals from the first and second SCSI bus segments while in the isolation mode.

12. The SCSI expander as recited in claim 10, wherein the segment controller generates the first signal in response to an isolation command received from the first SCSI bus segment.

13. The SCSI expander as recited in claim 12, wherein the segment controller disables the first signal to exit from the isolation mode.

14. The SCSI expander as recited in claim 13, wherein the segment controller disables the first signal when the second SCSI bus segment is in a bus free state.

15. The SCSI expander as recited in claim 13, wherein the first SCSI I/O interface circuit includes a first input buffer and a first output buffer and wherein the second SCSI I/O interface circuit includes a second input buffer and a second input buffer.

16. The SCSI expander as recited in claim 15, wherein the first and second input buffers are arranged to drive the communication signals for input to the SCSI expander from the first and second SCSI bus segments, respectively, and wherein the first buffers are arranged to drive the communication signals for output from the SCCI expander to the first and second SCSI bus segments, respectively.

17. The SCSI expander as recited in claim 16, wherein the first signal disables the first and second output buffers to disable the output of communication signals to the first and second SCSI bus segments, respectively.

* * * * *